United States Patent
You et al.

(10) Patent No.: US 9,987,929 B2
(45) Date of Patent: Jun. 5, 2018

(54) AIR COMPRESSOR CONTROL METHOD AND SYSTEM FOR FUEL CELL VEHICLE

(71) Applicant: Hyundai Motor Company, Seoul (KR)

(72) Inventors: Chang Seok You, Gyeonggi-Do (KR);
Min Su Kang, Gyeonggi-do (KR);
Sung Do Kim, Gyeonggi-do (KR);
Dong Hun Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 153 days.

(21) Appl. No.: 15/229,670

(22) Filed: Aug. 5, 2016

(65) Prior Publication Data
US 2017/0305275 A1 Oct. 26, 2017

(30) Foreign Application Priority Data
Apr. 26, 2016 (KR) .................. 10-2016-0051159

(51) Int. Cl.
*B60L 11/18* (2006.01)
*B60L 1/00* (2006.01)
*B60L 7/18* (2006.01)

(52) U.S. Cl.
CPC .............. *B60L 7/18* (2013.01); *B60L 1/003* (2013.01); *B60L 11/1883* (2013.01); *B60L 2240/547* (2013.01); *B60L 2240/549* (2013.01)

(58) Field of Classification Search
CPC .............. B60L 7/18; B60L 2240/547; B60L 2240/549; B60L 11/1883; B60L 1/003
See application file for complete search history.

(56) References Cited

U.S. PATENT DOCUMENTS

| | | | |
|---|---|---|---|
| 2010/0055522 A1* | 3/2010 | Manabe | B60L 1/003 429/431 |
| 2014/0167658 A1* | 6/2014 | Kwon | H02P 3/14 318/365 |

FOREIGN PATENT DOCUMENTS

| | | |
|---|---|---|
| JP | 2009-170377 A | 7/2009 |
| JP | 2011-019313 A | 1/2011 |
| JP | 2013-069485 A | 4/2013 |
| KR | 10-2008-0044097 | 5/2008 |
| KR | 10-2011-0059030 | 6/2011 |
| KR | 10-2014-0080691 A | 7/2014 |

\* cited by examiner

*Primary Examiner* — Dale Moyer
(74) *Attorney, Agent, or Firm* — Mintz Levin Cohn Ferris Glovsky and Popeo, P.C.; Peter F. Corless

(57) ABSTRACT

An air compressor control method for a fuel cell vehicle is provided. The method includes sensing variation information of a rotation speed of an air compressor motor and sensing a state of charge (SOC) of a high voltage battery by the fuel cell controller when the rotation speed of the air compressor motor is reduced. An allowable current from regenerative braking of an air compressor is derived using current consumption of an electric or electronic sub-assembly for a fuel cell vehicle in response to determining that the SOC exceeds a predetermined level of the SOC. The air compressor motor is then operated based on the allowable current from regenerative braking by an air compressor controller.

12 Claims, 2 Drawing Sheets

AIR COMPRESSOR CONTROL METHOD AND SYSTEM FOR FUEL CELL VEHICLE

CROSS REFERENCE TO RELATED APPLICATION

The present application claims priority to Korean Patent Application No. 10-2016-0051159, filed Apr. 26, 2016, the entire contents of which is incorporated herein for all purposes by this reference.

BACKGROUND

Field of the Invention

The present invention relates to an air compressor control method and system for a fuel cell vehicle, and more particularly, to an air compressor control method and system for a fuel cell vehicle in which an air compressor is used for regenerative breaking, whereby current is generated equal to an amount used by the fuel cell vehicle, even when a high voltage battery is in a highly charged state.

Description of the Related Art

Recently, attempts have been made to use an alternative engine for a vehicle instead of a conventional internal combustion engine to reduce environmental pollution by exhaust gas of a vehicle. For example, in a fuel cell vehicle, power to drive the vehicle is obtained by continuously generating electric energy by an electrochemical reaction, such as an electrolysis reverse reaction of water, in such a way that hydrogen supplied from a fuel supply unit and oxygen of air supplied from an air supply unit are supplied to a humidifier.

In particular, the generated electric energy is stored in a battery and is supplied to a motor when required. Recently, to efficiently use electric energy, a portion of a braking force of a vehicle is used to generate electricity, and a battery is charged using the generated electricity. In other words, a portion of kinetic energy generated by a driving speed of a vehicle is used for driving a generator. Thus, kinetic energy for restarting a vehicle is stored and at the same time, electric energy is generated. This type of method is referred to as regenerative braking. During regenerative braking, electric energy is generated by reversely driving a motor using a separate generator. Accordingly, any electric device including a motor may be used for regenerative braking. In the fuel cell vehicle described above, since an air compressor motor for supplying air to a fuel cell stack is provided in addition to a drive motor for a general electric vehicle, regenerative braking may be performed using the air compressor motor.

The foregoing is intended merely to aid in the understanding of the background of the present invention, and is not intended to mean that the present invention falls within the purview of the related art that is already known to those skilled in the art.

SUMMARY

Accordingly, the present invention provides an air compressor control method and system for a fuel cell vehicle in which when a rotation speed of an air compressor motor is reduced, fuel efficiency for the vehicle may be improved by maximally allowing regenerative braking of the air compressor although a high voltage battery is in a highly charged state.

According to one aspect of the present invention, an air compressor control method for a fuel cell vehicle may include: sensing variation information of a rotation speed of an air compressor motor by a fuel cell controller; sensing a state of charge (SOC) of a high voltage battery by the fuel cell controller when the rotation speed of the air compressor motor is reduced; deriving an allowable current from regenerative braking of an air compressor using current consumption of an electric or electronic sub-assembly for a fuel cell vehicle by the fuel cell controller in response to determining that the SOC exceeds a predetermined level of the SOC; and operating the air compressor motor based on the allowable current from regenerative braking by an air compressor controller.

The electric or electronic sub assembly may include: a stack cooling pump configured to circulate cooling water in a fuel cell stack; a drive motor configured to drive a fuel cell vehicle; and a direct current-direct current (DC/DC) convertor configured to supply charging voltage to an auxiliary battery. The allowable current from regenerative braking of the air compressor may be derived using an equation below:

$$I_{reg} = 2_{Vdc} * I_{dc\_e} / (3\lambda * w_e)$$

wherein $I_{reg}$ is the allowable current from regenerative braking of the air compressor, $V_{dc}$ is a voltage of an output DC terminal of a fuel cell, $I_{dc\_e}$ is the current consumption of the electric or electronic sub assembly, $\lambda$ is a magnetic flux interlinkage of the air compressor motor, and $w_e$ is an electrical angular velocity of the air compressor.

The allowable current from regenerative braking of the air compressor may be derived using an equation below:

$$I_{reg} = 2_{Vdc} * (I_{dc\_p} + I_{dc\_m} + I_{dc\_c}) / (3\lambda * w_e)$$

wherein $I_{reg}$ is the allowable current from regenerative braking of the air compressor, $V_{dc}$ is a voltage of an output DC terminal of a fuel cell, $I_{dc\_p}$ is current consumption of a stack cooling pump, $I_{dc\_m}$ is current consumption of a drive motor, $I_{dc\_c}$ is current consumption of a DC/DC convertor, $\lambda$ is a magnetic flux interlinkage of the air compressor motor, and $w_e$ is an electrical angular velocity of the air compressor.

The method may further include: after sensing the SOC, deriving a maximum current generated by regenerative braking of the air compressor as the allowable current from regenerative braking of the air compressor by the fuel cell controller when the SOC is equal to or less than the predetermined level of the SOC; and operating the air compressor motor based on the allowable current from regenerative braking by the air compressor controller.

The operating of the air compressor motor may include: comparing an actual current from regenerative braking with the allowable current from regenerative braking by the air compressor controller, the actual current being generated by reducing the rotation speed of the air compressor motor, deriving the allowable current from regenerative braking as a current command of the air compressor by the air compressor controller when the actual current from regenerative braking is equal to or greater than the allowable current from regenerative braking, or deriving the actual current from regenerative braking as the current command of the air compressor by the air compressor controller when the actual current from regenerative braking is less than the allowable current from regenerative braking; and operating the air compressor motor using the current command of the air compressor by the air compressor controller.

Additionally, the operating of the air compressor motor using the current command of the air compressor may include: applying the current command of the air compressor and an output current of the air compressor to a current controller by the air compressor controller, applying an output value of the current controller to space vector pulse width modulation and deriving a pulse width modulation signal of the air compressor motor by the air compressor controller, and operating the air compressor motor using the pulse width modulation signal by the air compressor controller.

An air compressor control system for a fuel cell vehicle may include: a fuel cell stack; a high voltage battery connected to the fuel cell stack, the high voltage battery being charged and discharged; a plurality of electric or electronic sub-assemblies installed in a fuel cell vehicle; an auxiliary battery configured to supply power to the electric or electronic sub-assemblies; an air compressor configured to supply air to the fuel cell stack; a fuel cell controller configured to sense variation information of a rotation speed of an air compressor motor, configured to sense a state of charge (SOC) of the high voltage battery when the rotation speed of the air compressor motor is reduced, and configured to derive an allowable current from regenerative braking of the air compressor using current consumption of the electric or electronic sub-assemblies in response to determining that the SOC exceeds a predetermined level of the SOC; and an air compressor controller configured to operate the air compressor motor based on the allowable current from regenerative braking.

The electric or electronic sub-assemblies may include: a stack cooling pump configured to circulate cooling water in the fuel cell stack; a drive motor configured to drive a fuel cell vehicle; and a DC/DC convertor configured to supply charging voltage to the auxiliary battery. The allowable current from regenerative braking of the air compressor may be derived using an equation below:

$$I_{reg} = 2V_{dc} * (I_{dc\_p} + I_{dc\_m} + I_{dc\_c})/(3\lambda * w_e)$$

wherein $I_{reg}$ is the allowable current from regenerative braking of the air compressor, $V_{dc}$ is a voltage of an output DC terminal of a fuel cell, $I_{dc\_p}$ is current consumption of the stack cooling pump, $I_{dc\_m}$ is current consumption of the drive motor, $I_{dc\_c}$ is current consumption of the DC/DC convertor, $\lambda$ is a magnetic flux interlinkage of the air compressor motor, and $w_e$ is an electrical angular velocity of the air compressor.

The air compressor controller may be configured to compare an actual current from regenerative braking with the allowable current from regenerative braking, the actual current being generated by reducing the rotation speed of the air compressor motor; the air compressor controller may be configured to derive the allowable current from regenerative braking as a current command of the air compressor when the actual current from regenerative braking is equal to or greater than the allowable current from regenerative braking, or the air compressor controller may be configured to derive the actual current from regenerative braking as the current command of the air compressor when the actual current from regenerative braking is less than the allowable current from regenerative braking; and the air compressor controller may be configured to operate the air compressor motor using the current command of the air compressor.

According to the air compressor control method and system for a fuel cell vehicle of the present invention, it is advantageous as follows.

First, the present invention may improve fuel efficiency for the vehicle by allowing regenerative braking of the air compressor although the high voltage battery is in the highly charged state.

Second, the present invention may improve durability of the vehicle in such a way that at the time of regenerative braking, an overvoltage by a charging limitation of the high voltage battery may be prevented in the output DC terminal of the fuel cell.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
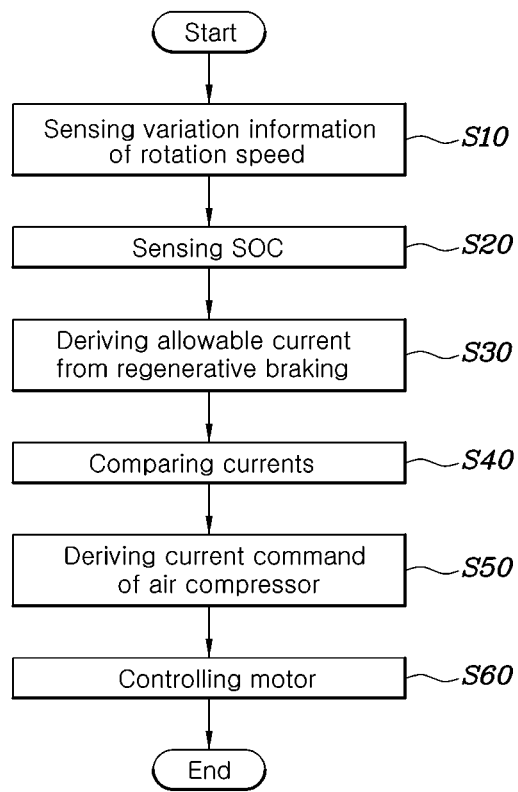
FIG. 1 is a flowchart illustrating an air compressor control method for a fuel cell vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, exemplary embodiments of the present invention will be described in detail with reference to the accompanying drawings. Throughout the drawings, the same reference numerals will refer to the same or like parts.

As shown in FIG. 1, an air compressor control method for a fuel cell vehicle may include: sensing, by a fuel cell controller 50 variation information of a rotation speed of an air compressor motor (S10); sensing, by the fuel cell controller 50, a state of charge (SOC) of a high voltage battery 20 when the rotation speed of the air compressor motor is reduced (S20); and deriving, by the fuel cell controller 50, an allowable current from regenerative braking of an air compressor 40 using current consumption of an electric or electronic sub assembly for a fuel cell vehicle in response to determining that the SOC of the high voltage battery 20 exceeds a predetermined level of the SOC (S30).

As described above, the present invention is intended to propose an air compressor control method and system for a fuel cell vehicle in which fuel efficiency may be improved in such a way that regenerative braking energy of an entire fuel cell vehicle may be maximized using regenerative braking of the air compressor 40. Thus, whether regenerative braking of the air compressor 40 is possible may first be determined. Accordingly, as shown in FIG. 1, variation in the rotation speed of the air compressor motor may be sensed by the fuel cell controller 50 in step S10 of sensing the variation information of the rotation speed.

Thereafter, regenerative braking may be considered to be possible since the high voltage battery may be charged by energy generated by reducing the rotation speed of the air compressor motor via the step S10 of sensing the variation information of the rotation speed. In particular, usually, the high voltage battery 20 may be charged by the energy generated by reducing the rotation speed. However, when the high voltage battery 20 is fully charged, the high voltage battery 20 may no longer be charged, and thus the energy may cause an overvoltage of a fuel cell system. Further, the fuel cell system may be damaged due to the overvoltage. Accordingly, in the present invention, before energy is generated by regenerative braking of the air compressor 40, the SOC of the high voltage battery 20 may be sensed via the step S20 of sensing the SOC.

In the present invention, after the step S20 of sensing the SOC, is the sensed SOC may be compared with a predetermined level of the SOC (e.g., a reference level of SOC). Particularly, the predetermined level of the SOC may determine whether the high voltage battery 20 is fully charged. Generally, when the SOC is about 80% or greater, the high voltage battery 20 may be considered to be fully charged. Thus, in the present invention, the predetermined level of the SOC may be about 80%. Meanwhile, the predetermined level may vary based on a type of high voltage battery or a design requirement in a fuel cell system.

When the SOC is equal to or less than the predetermined level of the SOC will be described later. As described above, in response to determining that the SOC of the high voltage battery 20 exceeds the predetermined level of the SOC, the control method according to the present invention is described below in detail. In particular, in the present invention, the step S30 of deriving the allowable current from regenerative braking of the air compressor 40 using the current consumption of the electric or electronic sub-assembly for a fuel cell vehicle by the fuel cell controller 50 may be performed. In other words, since the high voltage battery is fully charged, it may be necessary to restrict the amount of voltage to prevent the overvoltage as described above.

In the present invention, the current consumption of the electric or electronic sub assembly for a fuel cell vehicle may be used to derive the allowable current from regenerative braking since power supplied to the electric or electronic sub-assembly may be from the high voltage battery 20. Thus, when regenerative braking of the air compressor 40 is allowed to produce current equal to the amount of current consumed by the electric or electronic sub-assembly, power equal to the amount of power consumed by the high voltage battery 20 may be supplied. Accordingly, overvoltage may not occur in the fuel cell system.

More specifically, the allowable current from regenerative braking of the air compressor 40 may be derived by using an equation below:

$$I_{reg}=2_{Vdc}*I_{dc\_e}/(3\lambda*w_e)$$

wherein $I_{reg}$ is the allowable current from regenerative braking of the air compressor 40, $V_{dc}$ is a voltage of an output DC terminal of a fuel cell, $I_{dc\_e}$ is the current consumption of the electric or electronic sub assembly for a fuel cell vehicle, $\lambda$ is a magnetic flux interlinkage of the air compressor motor, and $w_e$ is an electrical angular velocity of the air compressor 40.

The above equation may be derived using a motor power equation below:

$$P=3*(I_D*V_D+I_Q*V_Q)/2$$

In particular, the electric or electronic sub-assembly for a fuel cell vehicle may include various electric or electronic sub-assemblies for a fuel cell vehicle. Generally, the electric or electronic sub-assembly for a fuel cell vehicle may include: a stack cooling pump 32 configured to circulate cooling water in a fuel cell stack 10; a drive motor 36 configured to drive a fuel cell vehicle; and a DC/DC convertor 34 for supplying charging voltage to an auxiliary battery 70. Furthermore, since the stack cooling pump 32, the drive motor 36, and the DC/DC convertor 34 use a large amount of current among the electric or electronic sub-assemblies, the allowable current from regenerative braking may be derived using an equation below:

$$I_{reg}=2_{Vdc}*(I_{dc\_p}+I_{dc\_m}+I_{dc\_c})/(3\lambda*w_e)$$

wherein $I_{reg}$ is the allowable current from regenerative braking of the air compressor 40, $V_{dc}$ is a voltage of an output DC terminal of a fuel cell, $I_{dc\_p}$ is current consumption of a stack cooling pump 32, $I_{dc\_m}$ is current consumption of a drive motor 36, $I_{dc\_c}$ is current consumption of a DC/DC convertor 34, $\lambda$ is a magnetic flux interlinkage of the air compressor motor, and $w_e$ is an electrical angular velocity of the air compressor 40.

Meanwhile, as described above, when the SOC of the high voltage battery 20 is equal to or less than the predetermined level of the SOC, it is not necessary to derive the allowable current from regenerative braking since the high voltage battery may be charged (e.g., is capable of being charged). Accordingly, in the present invention, when the SOC of the high voltage battery 20 is equal to or less than the predetermined level of the SOC, a maximum current generated by regenerative braking of the air compressor 40 may be derived as the allowable current from regenerative braking of the air compressor 40.

Regardless of whether the SOC of the high voltage battery 20 exceeds the predetermined level of the SOC, after performing the step S30 of deriving the allowable current from regenerative braking, step S60 of operating the air compressor motor based on the allowable current from regenerative braking may be performed by an air compressor controller 60. More specifically, as shown in FIG. 1, the step S60 of operating the air compressor motor may be performed via step S40 of comparing an actual current from regenerative braking with the allowable current from regenerative braking by the air compressor controller 60, the actual current generated by reducing the rotation speed of the air compressor motor, step S50 of deriving the allowable current from regenerative braking as a current command of the air compressor 40 by the air compressor controller 60 when the actual current from regenerative braking is equal to or greater than the allowable current from regenerative braking, or step S50 of deriving the actual current from regenerative braking as a current command of the air compressor 40 by the air compressor controller 60 when the actual current from regenerative braking is less than the allowable current from regenerative braking; and operating the air compressor motor using the current command of the air compressor by the air compressor controller.

Further to the step S60 as described above, the actual current from regenerative braking may not exceed the allowable current from regenerative braking by comparing the actual current actually generated by regenerative braking of the air compressor motor with the allowable current from regenerative braking derived via the step S30 of deriving the allowable current from regenerative braking. Accordingly, the overvoltage in the fuel cell system may not occur by regenerative braking of the air compressor 40, and regenerative braking of the air compressor 40 may be maximized, thereby improving fuel efficiency of a fuel cell vehicle.

At the step S60 of operating the air compressor motor, the air compressor motor may be operated by the air compressor controller 60 using the current command derived via the step S50 of deriving the current command. More specifically, the air compressor motor may be operated via applying the current command of the air compressor 40 and an output current of the air compressor 40 to a current controller by the air compressor controller, applying an output value of the current controller to space vector pulse width modulation (SVPWM), and deriving a pulse width modulation (PWM) signal of the air compressor motor by the air compressor controller 60; and operating the air compressor motor using the pulse width modulation signal by the air compressor controller 60.

Figure 2:
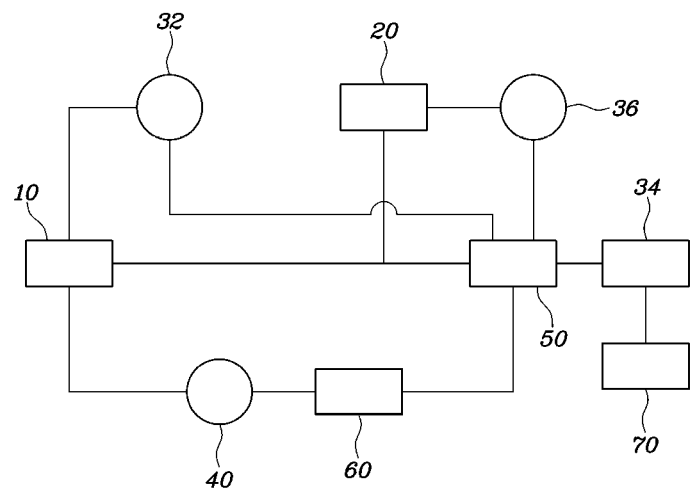
FIG. 2 is a view illustrating the configuration of an air compressor control system for a fuel cell vehicle according to an exemplary embodiment of the present invention.

In addition, as shown in FIG. 2, an air compressor control system for a fuel cell vehicle according to the present invention may include: a fuel cell stack 10; a high voltage battery 20 connected to the fuel cell stack 10, the high voltage battery being charged and discharged; a plurality of electric or electronic sub-assemblies installed with a fuel cell vehicle; an auxiliary battery 70 configured to supply power to the electric or electronic sub-assemblies; an air compressor 40 configured to supply air to the fuel cell stack 10; a fuel cell controller 50 configured to sense or detect variation information of a rotation speed of an air compressor motor, sense a state of charge (SOC) of the high voltage battery 20 when the rotation speed of the air compressor motor is reduced, and for deriving an allowable current from regenerative braking of the air compressor 40 using current consumption of the electric or electronic sub-assemblies in response to determining that the SOC of the high voltage battery 20 exceeds a predetermined level of the SOC; and an air compressor controller 60 configured to operate the air compressor motor based on the allowable current from regenerative braking. In particular, as shown in FIG. 2, the electric or electronic sub-assemblies may include: a stack cooling pump configured to circulate cooling water in the fuel cell stack 10; a drive motor 36 configured to drive a fuel cell vehicle; and a DC/DC convertor 34 configured to supply charging voltage to the auxiliary battery 70.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An air compressor control method for a fuel cell vehicle, comprising:

sensing, by a controller, variation information of a rotation speed of an air compressor motor, sensing, by the controller, a state of charge (SOC) of a high voltage battery when the rotation speed of the air compressor motor is reduced;

deriving, by the controller, an allowable current from regenerative braking of an air compressor using current consumption of an electric or electronic sub-assembly for the fuel cell vehicle in response to determining that the SOC exceeds a predetermined level of the SOC; and operating, by the controller, the air compressor motor based on the allowable current from regenerative braking by an air compressor controller.

2. The method of claim 1, wherein the electric or electronic sub assembly includes:

a stack cooling pump configured to circulate cooling water in a fuel cell stack;

a drive motor configured to drive the fuel cell vehicle; and a direct current-direct current (DC/DC) convertor configured to supply charging voltage to an auxiliary battery.

3. The method of claim 1, wherein the allowable current from regenerative braking of the air compressor is derived using an equation below:

$$I_{reg} = 2_{Vdc} * I_{dc\_e}/(3\lambda * w_e)$$

wherein $I_{reg}$ is the allowable current from regenerative braking of the air compressor, $V_{dc}$ is a voltage of an output direct current (DC) terminal of a fuel cell, $I_{dc\_e}$ is the current consumption of the electric or electronic sub assembly, $\lambda$ is a magnetic flux interlinkage of the air compressor motor, and $w_e$ is an electrical angular velocity of the air compressor.

4. The method of claim 1, wherein the allowable current from regenerative braking of the air compressor is derived using an equation below:

$$I_{reg} = 2_{Vdc} * (I_{dc\_p} + I_{dc\_m} + I_{dc\_c})/(3\lambda * w_e)$$

wherein $I_{reg}$ is the allowable current from regenerative braking of the air compressor, $V_{dc}$ is a voltage of an output direct current (DC) terminal of a fuel cell, $I_{dc\_p}$ is current consumption of a stack cooling pump, $I_{dc\_m}$ is current consumption of a drive motor, $I_{dc\_c}$ is current consumption of a DC/DC convertor, d is a magnetic flux interlinkage of the air compressor motor, and $w_e$ is an electrical angular velocity of the air compressor.

5. The method of claim 1, further comprising after the sensing of the SOC:

deriving, by the controller, a maximum current generated by regenerative braking of the air compressor as the allowable current from regenerative braking of the air compressor when the SOC is equal to or less than the predetermined level of the SOC; and operating, by the controller, the air compressor motor based on the allowable current from regenerative braking by the air compressor controller.

6. The method of claim 5, wherein the operating of the air compressor motor includes:

comparing, by the controller, an actual current from regenerative braking with the allowable current from regenerative braking, the actual current being generated by reducing the rotation speed of the air compressor motor;

deriving, by the controller, the allowable current from regenerative braking as a current command of the air compressor when the actual current from regenerative braking is equal to or greater than the allowable current from regenerative braking, or deriving the actual current from regenerative braking as the current command of the air compressor when the actual current from regenerative braking is less than the allowable current from regenerative braking; and operating, by the controller, the air compressor motor using the current command of the air compressor by the air compressor controller.

7. The method of claim 6, wherein the operating of the air compressor motor using the current command of the air compressor includes:

applying, by the controller, the current command of the air compressor and an output current of the air compressor to a current controller, applying, by the controller, an output value of the current controller to space vector pulse width modulation and deriving a pulse width modulation signal of the air compressor motor; and operating, by the controller, the air compressor motor using the pulse width modulation signal.

8. The method of claim 1, wherein the controlling of the air compressor motor includes:

comparing, by the controller, an actual current from regenerative braking with the allowable current from regenerative braking, the actual current being generated by reducing the rotation speed of the air compressor motor;

deriving, by the controller, the allowable current from regenerative braking as a current command of the air compressor when the actual current from regenerative braking is equal to or greater than the allowable current from regenerative braking, or deriving the actual current from regenerative braking as the current command of the air compressor when the actual current from regenerative braking is less than the allowable current from regenerative braking; and operating, by the controller, the air compressor motor using the current command of the air compressor.

9. An air compressor control system for a fuel cell vehicle, the system comprising:

a fuel cell stack;

a high voltage battery connected to the fuel cell stack, the high voltage battery being charged and discharged;

a plurality of electric or electronic sub-assemblies installed within the fuel cell vehicle;

an auxiliary battery configured to supply power to the electric or electronic sub-assemblies;

an air compressor configured to supply air to the fuel cell stack;

a fuel cell controller configured to sense variation information of a rotation speed of an air compressor motor, sense a state of charge (SOC) of the high voltage battery when the rotation speed of the air compressor motor is reduced, and derive an allowable current from regenerative braking of the air compressor using current consumption of the electric or electronic sub-assemblies in response to determining that the SOC exceeds a predetermined level of the SOC; and an air compressor controller configured to operate the air compressor motor based on the allowable current from regenerative braking.

10. The system of claim 9, wherein the electric or electronic sub-assemblies includes:

a stack cooling pump configured to circulate cooling water in the fuel cell stack;

a drive motor configured to drive the fuel cell vehicle; and a direct current-direct current (DC/DC) convertor configured to supply charging voltage to the auxiliary battery.

11. The system of claim 10, wherein the allowable current from regenerative braking of the air compressor is derived using an equation below:

$$I_{reg} = 2V_{dc} * (I_{dc\_p} + I_{dc\_m} + I_{dc\_c}) / (3\lambda * w_e)$$

wherein $I_{reg}$ is the allowable current from regenerative braking of the air compressor, $V_{dc}$ is a voltage of an output DC terminal of a fuel cell, $I_{dc\_p}$ is current consumption of the stack cooling pump, $I_{dc\_m}$ is current consumption of the drive motor, $I_{dc\_c}$ is current consumption of the DC/DC convertor, $\lambda$ is a magnetic flux interlinkage of the air compressor motor, and $w_e$ is an electrical angular velocity of the air compressor.

12. The system of claim 9, wherein the air compressor controller is configured to compare an actual current from regenerative braking with the allowable current from regenerative braking, the actual current being generated by reducing the rotation speed of the air compressor motor, the air compressor controller is configured to drive the allowable current from regenerative braking as a current command of the air compressor when the actual current from regenerative braking is equal to or greater than the allowable current from regenerative braking, or the air compressor controller is configured to derive the actual current from regenerative braking as the current command of the air compressor when the actual current from regenerative braking is less than the allowable current from regenerative braking; and the air compressor controller is configured to operate the air compressor motor using the current command of the air compressor.

* * * * *